US008051276B2

(12) United States Patent
Krieger et al.

(10) Patent No.: US 8,051,276 B2
(45) Date of Patent: Nov. 1, 2011

(54) OPERATING SYSTEM THREAD SCHEDULING FOR OPTIMAL HEAT DISSIPATION

(75) Inventors: Orran Y. Krieger, Newton, MA (US); Bryan S. Rosenburg, Cortlandt Manor, NY (US); Robert B. Tremaine, Stormville, NY (US); Robert W. Wisniewski, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 11/482,270

(22) Filed: Jul. 7, 2006

(65) Prior Publication Data

US 2008/0022076 A1      Jan. 24, 2008

(51) Int. Cl.
G06F 7/38        (2006.01)
(52) U.S. Cl. ....................................................... 712/220
(58) Field of Classification Search .................... 712/220
See application file for complete search history.

(56) References Cited

U.S. PATENT DOCUMENTS

| 5,422,806 | A | 6/1995 | Chen et al. | |
| 5,502,838 | A | 3/1996 | Kikinis | |
| 7,784,050 | B2 * | 8/2010 | Harris | 718/100 |
| 2006/0005097 | A1 * | 1/2006 | Ichikawa et al. | 714/745 |
| 2006/0070074 | A1 * | 3/2006 | Maeda et al. | 718/100 |
| 2006/0095913 | A1 * | 5/2006 | Bodas et al. | 718/100 |
| 2007/0033425 | A1 * | 2/2007 | Clark | 713/320 |

* cited by examiner

*Primary Examiner* — Eddie P Chan
*Assistant Examiner* — John Lindlof
(74) *Attorney, Agent, or Firm* — Scully, Scott, Murphy & Presser, P.C.; Daniel P. Morris, Esq.

(57) ABSTRACT

A method and system for thread scheduling for optimal heat dissipation are provided. Temperature sensors measure temperature throughout various parts of a processor chip. The temperatures detected are reported to an operating system or the like for scheduling threads. In one aspect, the observed temperature values are recorded on registers. An operating system or the like reads the registers and schedules threads based on the temperature values.

19 Claims, 3 Drawing Sheets

OPERATING SYSTEM THREAD SCHEDULING FOR OPTIMAL HEAT DISSIPATION

STATEMENT REGARDING FEDERALLY SPONSORED RESEARCH OR DEVELOPMENT

This invention was made with Government support under Contract No.:NBCH020056 (DARPA) awarded by Defense, Advanced Research Projects Agency. The Government has certain rights in this invention.

FIELD OF THE INVENTION

The present disclosure generally relates to computer processing and particularly to power and heat scheduling and to operating systems and thread scheduling.

BACKGROUND OF THE INVENTION

As the number of transistors placed on processor-chips and thus transistor density has increased, there has been an increasing need and thus emphasis put on heat and power dissipation. Previous work has focused on better power utilization through voltage scaling and other techniques. However, little work has been done to reduce hot spots by spreading heat dissipation. Part of what was lacking was feedback relating to temperature on various parts of the chip from the hardware. For the next generation chips, for example, with multiple cores per chip, the placement of threads and hence their interaction with the cache subsystem will have a significant impact on heat.

While next-generation chips may be designed to shutdown when overheating is detected, it would be desirable to have a method and system that would circumvent the overheating from happening in the first place. For instance, it would be desirable to have an operating system schedule threads in a manner that would avoid multiple threads executing at the same time on densely clustered cores or on those cores where temperature is already high or otherwise schedule threads so that heat condition on a chip is minimized. In conventional chip designs, hardware does not provide information about heat and temperature, for example, throughout the chip or related to given hardware threads. In addition, conventional operating systems are not designed to handle or consider temperature data when scheduling threads. Accordingly, what is needed is a method and system that allow hardware to consider and provide temperature information to software such as the operating system or the like, and for that software or operating system to use the temperature data when scheduling threads on execution cores.

BRIEF SUMMARY OF THE INVENTION

A system and method for scheduling threads for optimal heat dissipation are provided. The system in one aspect includes a plurality cores located on a processor chip. The plurality of cores is operable to execute one or more threads. One or more temperature sensors are placed throughout the processor chip and the one or more temperature sensors are operable to provide temperature of one or more areas on the processor chip. One or more registers are operable to store the temperature. The system in one aspect further includes a thread scheduler operable to schedule one or more threads on one or more of the plurality of cores based on the temperature information.

In one aspect, the thread scheduler may be an operating system. In another aspect, the thread scheduler may be operable to schedule one or more threads to minimize heat on the processor chip. In one aspect, the one or more areas may include one or more processing elements. The one or more areas may include one or more cores. In one aspect, the thread scheduler may be operable to suspend one or more threads if the temperature reaches a predetermined value. In another aspect, the thread scheduler may be operable to reschedule one or more threads if the temperature reaches a predetermined value.

Yet in another aspect, the system may further include an interrupt vector and a register associated with the interrupt vector. The register may be operable to store temperature information and associated temperature sensor that caused the interrupt vector to be generated.

Still yet, a system for scheduling threads for optimal heat dissipation may include a plurality cores located on a processor chip, the plurality of cores operable to execute one or more threads. One or more temperature sensors are placed throughout the processor chip, the one or more temperature sensors operable to provide temperature information of one or more areas on the processor chip. The system includes means for communicating the temperature information and mean's for scheduling one or more threads on one or more of the plurality of cores based on the temperature information. In one aspect, the means for scheduling may include an operating system. The system may further include means for generating an interrupt when at least one of the temperature sensors reaches a predetermined temperature. The system may also include means for receiving and handling the interrupt. In one aspect, the means for receiving and handling the interrupt may be operable to reschedule one or more threads running on a core associated with the temperature sensor that caused the interrupt to a core located in cooler area of the processor chip.

A method of scheduling threads for optimal heat dissipation in one aspect includes accessing temperature information associated with one or more cores on a processor chip, evaluating heat generating information associated with one or more threads and scheduling the one or more threads on the one or more cores based on the temperature information and the heat generating information. In one aspect, the step of scheduling may include migrating a scheduled thread to one or more different cores during execution of the scheduled thread if the scheduled thread is considered to be high heat generating thread based on the evaluating step.

In another aspect, the step of scheduling may include scheduling a thread that is generating heat to be run on one or more cores located on outer side part of the processor chip. The method may further include determining heat generating information associated with one or more threads. In one aspect, the step of determining heat generating information associated with one or more threads may include checking the temperature information before scheduling a thread, scheduling the thread, rechecking the temperature information when the thread finishes running, and observing the difference in the temperature information, the difference in the temperature information being the heat generating information associated with the thread.

Still yet, the method may further include handling an interrupt generated as a result of one or more temperature sensors on the processor chip detecting a predetermined temperature. In one aspect, the step of handling an interrupt may include determining what part of the processor chip has reached the predetermined temperature, and rescheduling one or more threads running on the determined part of the processor chip to a cooler part of the processor chip.

DETAILED DESCRIPTION

Figure 1:
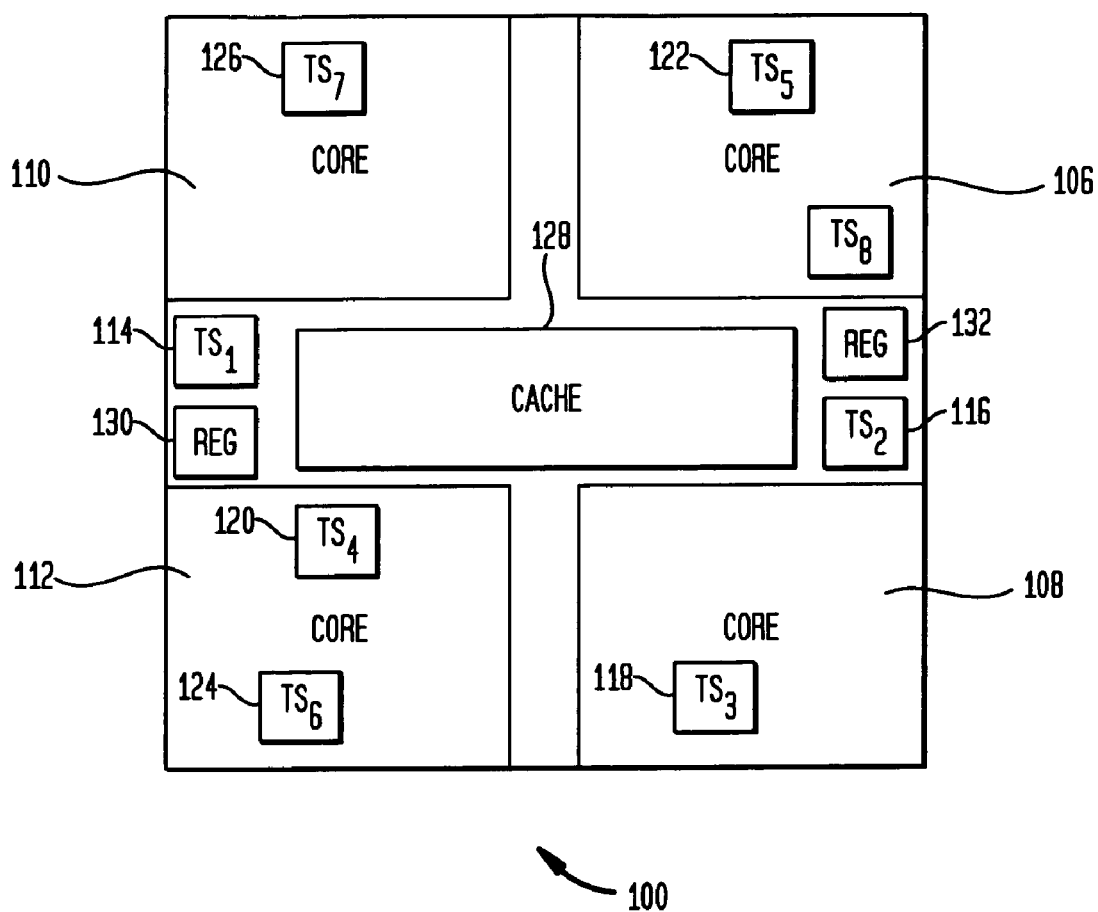
FIG. 1 is a block diagram illustrating various components for scheduling threads for optimal heat dissipation in one embodiment of the present disclosure.

FIG. 1 is a block diagram illustrating processor chip components for scheduling threads for optimal heat dissipation in one embodiment of the present disclosure. A processor 100 may include a plurality of processor cores 106, 108, 110, 112. The processor cores 106, 108, 110, 112 for example may include processing elements such as functional units, arithmetic logic units (ALUs), L1 cache, etc. for carrying out instructions or executing threads. Threads and processes are generally instances of an executing program. For instance, a running program can be referred to as a process. Each process can have one or more threads of execution. In this disclosure, the terms process and thread are used interchangeably. The processor 100 may be a microprocessor chip having one or more main processors or cores and may be enclosed in an integrated circuit (IC) package. The processor 100 may function as a general purpose computer and/or as a processor unit in a special-purpose system.

In an exemplary embodiment of the present disclosure, one or more temperature sensors 114, 116, 118, 120, 122, 124, 126 are located scattered throughout the chip 100 and, for example, on top of the cores 106, 108, 110, 112. There may be multiple temperature sensors within a particular core, cache, or any other region of transistors. In one embodiment, each of the temperature sensors 114, 116, 118, 120 detect the temperature of its surrounding area including the cores near the sensors, buses, vicinity of cache 128, etc. The temperature sensors 114, 116, 118, 120 may be any known or will-be-known device or unit that can be placed on a processor chip and/or near it to detect the temperatures throughout the various cores and other components on the chip. In an exemplary embodiment of the present disclosure, an operating system or software or the like uses the temperature information of various parts of the chip and cores on the chip to schedule threads on the cores. The operating system or the like may also use the information to determine how much heat a given thread generates, using that information to for example schedule the threads in the future on different parts of the chip so as to dissipate or distribute heat. This may be done for example, by tracking the delta temperature change between when a thread resumes and when it is paused.

In one embodiment of the present disclosure, the temperature information is conveyed to an operating system or the like by using one or more memory registers that store the temperature data. For instance, there may be one or more registers 130, 132 placed near one or more or group of temperature sensors. The registers 130, 132, for example, store information from the temperature sensors located near the registers. Any other known or will-be-known method or device for sensing temperature may be utilized. In addition, any other known or will-be-known method or device for reporting the temperature throughout the chip may be utilized.

Figure 2:
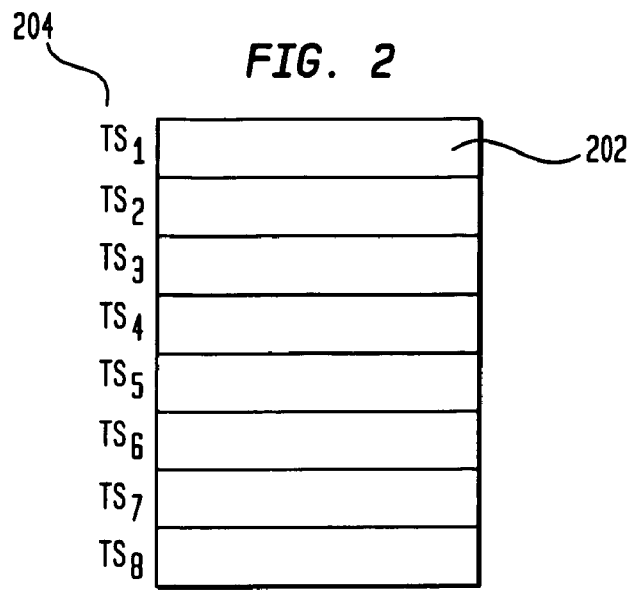
FIG. 2 is a table showing register memory that stores temperature information in one embodiment of the present disclosure.

FIG. 2 is a table showing register memory that stores temperature information in one embodiment of the present disclosure. An entry 202 in the table stores temperature detected by a temperature sensor 204 on the core. There may be more than one such register memory located scattered throughout the chip, for example, near where the temperature sensors are placed, so that for example, the hardware storing the information need not travel far to record the temperature. The temperature information may be updated periodically, for instance, every predetermined period. In another embodiment, it may be updated whenever there is a change in the temperature or the temperature changes exceed a predetermined range.

The registers are accessible by an operating system or the like so that the operating system may read the information and use it to perform scheduling. For instance, the operating system or the like may arrange to schedule threads on parts of the chip or on a core that has less heat being generated so that heat may be distributed throughout the chip. In addition, the operating system or the like may discover, for example, from reading the temperature sensor table, that one part of the chip or one particularly core has particularly high temperature. The operating system or the like in such cases may migrate a thread running on that core as to minimize the heat being generated out of that core.

Another aspect of the exemplary embodiment of the present disclosure may keep track of the heat being generated by a given thread. Heat being generated may be detected, for instance, by observing the temperature of the temperature sensors near or on the core that is running that thread and also by observing temperature sensors near the components that are affected by the running thread, for example, the buses that are used on the way to the cache that the thread is accessing, etc.

Figure 3:
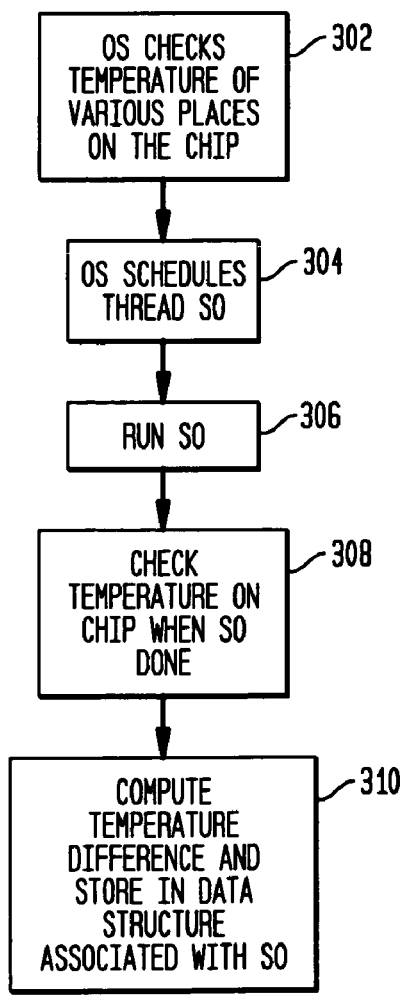
FIG. 3 is a flow diagram illustrating a method of detecting heat being generated by a given thread in one embodiment of the present disclosure.

FIG. 3 is a flow diagram illustrating a method of detecting heat being generated by a given thread in one embodiment of the present disclosure. At 302, an operating system or the like checks the temperatures throughout the chip, for instance, by reading the temperature sensor table shown in FIG. 2. At 304, the operating system schedules software thread $S_0$. At 306, the operating system allows $S_0$, for example, to run for a predetermined period. When the thread finishes or during the thread's execution, the operating system again checks the temperature sensor table at 308 and calculates the temperature difference of before and after the thread scheduling. At 310, the operating system or the like stores computed temperature difference and associates the value with thread $S_0$. The observed temperature difference is the amount of heat that is generated by this thread. This information may be stored in software data structure, which the operating may access to perform scheduling.

In an exemplary embodiment of the present disclosure, an operating system or the like may use the temperature information from the hardware to schedule one or more threads to execute on one or more cores on a processor chip. The operating system or the like may arrange the threads for execution based on the temperature information for optimal heat dissipation. In one embodiment of the present disclosure, an operating system or the like may keep track of the amount of heat that is generated by a thread when scheduling a thread, for instance, by looking up the data structure that stores heat information for associated threads. Knowing the amount of heat that threads generate, for instance, by looking up the data structure described above, the operating system may place two hot threads (threads that are determined to generate relatively high amount of heat) far apart, that is, in cores that are well separated on a chip. As another example, the operating system may run a particularly hot thread initially on one core, then move it around to a different core, etc., to dissipate the heat being generated by this hot thread.

Generally heat is dissipated more on the side of the chip than the center. Therefore, as yet another example of scheduling, if the operating detects a thread that is particularly hot, the operating system or the like may place or schedule the thread on a core that is on or near the side of the chip rather than placing it on a core that is on or toward the center of the chip. The operating system or the like may also place threads near the portion of the non-uniform cache architecture (NUCA) cache the thread is utilizing in order to reduce the distance data needs to travel to get to its thread. Since sending bits across the chip generates heat, this is useful in minimizing heat generation, for instance, for a thread that is generating heat due to significant data transport. The operating system or the like may use any other schema or policy to dissipate heat or otherwise handle heat generation on a chip using the temperature data.

As another example, if a portion of the chip is becoming too hot, that is, it reaches a predetermined temperature value or range, the operating system may temporarily suspend the operation of one of the threads before the hardware has to forcibly shut the chip down.

In one embodiment of the present disclosure, in the event that a hardware thread needs to be suspended, the operating system or the like may change the mapping of application threads to hardware threads in order to guarantee that high priority application threads continue to stay mapped to currently executing hardware threads.

Figure 4:
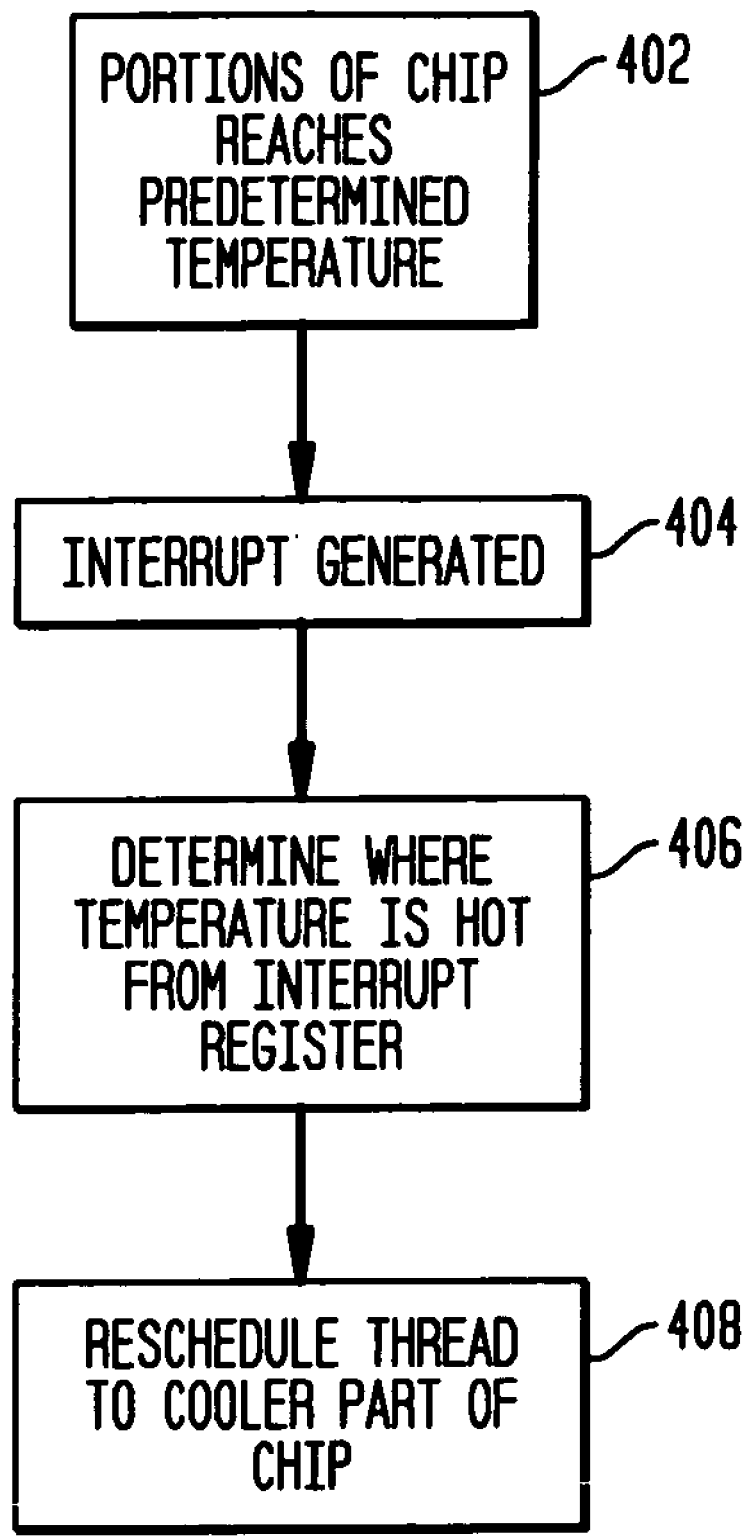
FIG. 4 is flow diagram illustrating a method of handling heat condition using a new interrupt vector in one embodiment of the present disclosure.

Another embodiment of the present disclosure provides a new interrupt vector for heat conditions. For instance, when the temperature reaches a predetermined value or range, the hardware generates an interrupt to an operating system or the like. FIG. 4 is flow diagram illustrating a method of handling heat condition using a new interrupt vector in one embodiment of the present disclosure. At 402, an area or portion of a chip gets hot, for instance, it reaches a predetermined temperature. At 404, interrupt is generated to the operating system. A register associated with the interrupt stores the information relating to which temperature sensors became too hot as to cause the interrupt to be generated. This register for example may be 64-bit register enabled to store information about all temperature sensors on the chip. An operating system or the like will know to read the register to determine which section or sections of the chip has high heat. At 406, an interrupt associated register indicates which temperature sensor or which part of the chip is hot. At 408, the operating system or the like, looking at the interrupt associated register, reschedules threads that are running on a core in that area of the chip to a core on the cooler parts of the chip. The operating system may determine which parts of the chip are cooler, for instance, by evaluating the temperature sensor table information, such as the one shown in reference with FIG. 2.

In another embodiment of the present disclosure, the operating system or the like may continue to evaluate the temperature every time a thread runs to, for example, get more accurate reading of the heat a thread generates. Yet in another embodiment, the hardware may store the thread identifier (ID) of a thread executing on a core along with the core's temperature data in a register. An operating system or the like may access the stored data, map the hardware thread id to its software thread id, and evaluate the thread and corresponding core's heat condition, and make informed scheduling or re-scheduling decisions.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for scheduling threads for optimal heat dissipation, comprising:

a plurality of cores located on a processor chip, the plurality of cores operable to execute one or more threads;

a plurality of temperature sensors placed throughout the processor chip in a plurality of areas of the processor chip, the plurality of temperature sensors operable to provide temperature information associated respectively with the plurality of areas on the processor chip;

one or more registers operable to store the temperature information associated respectively with the plurality of areas on the processor chip; and a thread scheduler operable to schedule one or more threads on one or more of the plurality of cores based on the temperature information, wherein the thread scheduler further arranges a predetermined thread for execution on one core initially, keeps track of heat being generated by the predetermined thread, moves the predetermined thread to another core to dissipate heat being generated by the predetermined thread, the predetermined thread having been determined based on heat generating information of the predetermined thread, the heat generating information of the predetermined thread having been pre-evaluated by looking up temperatures of areas including areas outside the one or more cores, where one or more buses and cache affected by execution of the predetermined thread are located before running the predetermined thread and after running the predetermined thread for a period of time and determining the differences in the temperatures of before and after running the predetermined thread, the thread scheduler further identifying a portion in a non-uniform cache architecture the predetermined thread is utilizing and identifying a core that is nearer to the portion in the non-uniform cache architecture than one or more other cores of the plurality of cores, and placing the predetermined thread on the identified core that is nearer to the portion in a non-uniform cache architecture in order to minimize heat generated by data transport.

2. The system of claim 1, wherein the thread scheduler is an operating system.

3. The system of claim 1, wherein the thread scheduler is operable to schedule one or more threads to minimize heat on the processor chip.

4. The system of claim 1, wherein the plurality of areas include a cache or regions of transistors, areas of buses, or combinations thereof.

5. The system of claim 1, wherein the plurality of areas include one or more cores.

6. The system of claim 1, wherein the thread scheduler is operable to suspend one or more threads if the temperature information reaches a predetermined value, wherein in the event that a hardware thread is suspended, the thread scheduler is further operable to change mapping of application threads to hardware threads.

7. The system of claim 1, further including:
an interrupt vector; and
a register associated with the interrupt vector, the register operable to store temperature information received from an associated temperature sensor that caused the interrupt vector to be generated.

8. A system for scheduling threads for optimal heat dissipation, comprising:
a plurality of cores located on a processor chip, the plurality of cores operable to execute one or more threads;
a plurality of temperature sensors placed on selected areas throughout the processor chip, the plurality of temperature sensors operable to provide temperature information of their respective surrounding areas on the processor chip, the selected areas including at least a cache or regions of transistors, areas of buses, or combinations thereof;
means for communicating the temperature information; and
means for scheduling one or more threads on one or more of the plurality of cores based on the temperature information, the means for scheduling further arranges a predetermined thread for execution on one core initially, keeps track of heat being generated by the predetermined thread, moves the predetermined thread to another core to dissipate heat being generated by the predetermined thread, the predetermined thread having been determined based on heat generating information of the predetermined thread, the heat generating information of the predetermined thread having been pre-evaluated by looking up temperatures of areas including areas outside the one or more cores, where one or more buses and cache affected by execution of the predetermined thread are located before running the predetermined thread and after running the predetermined thread for a period of time and determining the differences in the temperatures of before and after running the predetermined thread, the means for scheduling further identifying a portion in a non-uniform cache architecture the predetermined thread is utilizing and identifying a core that is nearer to the portion in the non-uniform cache architecture than one or more other cores of the plurality of cores, and placing the predetermined thread on the identified core that is nearer to the portion in a non-uniform cache architecture in order to minimize heat generated by data transport.

9. The system of claim 8, wherein the means for scheduling includes an operating system.

10. The system of claim 8, further including:
means for generating an interrupt when at least one of the temperature sensors reaches a predetermined temperature.

11. The system of claim 10, further including:
means for receiving and handling the interrupt.

12. The system of claim 11, wherein the means for receiving and handling the interrupt is operable to reschedule one or more threads running on a core associated with a temperature sensor that caused the interrupt to a core located in cooler area of the processor chip.

13. A method of scheduling threads for optimal heat dissipation, comprising:
accessing temperature information associated with a plurality of areas on a processor chip, the plurality of areas including at least a cache, regions of transistors, areas of buses, or combinations thereof;
evaluating heat generating information associated with one or more threads;
scheduling the one or more threads on the one or more cores based on the temperature information and the heat generating information; and
arranging a predetermined thread for execution on one core initially, keeping track of heat being generated by the predetermined thread, moving the predetermined thread to another core to dissipate heat being generated by the predetermined thread, the predetermined thread having been determined based on heat generating information of the predetermined thread, the heat generating information of the predetermined thread having been pre-evaluated by looking up temperatures of areas including areas outside the one or more cores, where one or more buses and cache affected by execution of the predetermined thread are located before running the predetermined thread and after running the predetermined thread for a period of time and determining the differences in the temperatures of before and after running the predetermined thread,
the scheduling the one or more threads on one or more cores further including identifying a portion in a non-uniform cache architecture that one or more threads are utilizing and identifying a core that is nearer to the portion in the non-uniform cache architecture than one or more other cores, and placing said one or more threads on the identified core that is nearer to the portion in the non-uniform cache architecture in order to minimize heat generated by data transport.

14. The method of claim 13, wherein the step of scheduling includes migrating a scheduled thread to one or more different cores during execution of the scheduled thread based on the evaluating step.

15. The method of claim 13, wherein the step of scheduling includes scheduling a thread that is generating heat on one or more cores located on outer side part of the processor chip.

16. The method of claim 13, further including:
determining heat generating information associated with one or more threads.

17. The method of claim 16, wherein the step of determining includes:
checking the temperature information before scheduling a thread;
scheduling the thread;
rechecking the temperature information when the thread finishes running; and
tracking difference in the temperature information, the difference in the temperature information being the heat generating information associated with the thread.

18. The method of claim 13, further including:
handling an interrupt generated as a result of one or more temperature sensors on the processor chip detecting a predetermined temperature.

19. The method of claim 18, wherein the step of handling includes:
determining what part of the processor chip has reached the predetermined temperature;
and rescheduling one or more threads running on the determined part of the processor chip to a cooler part of the processor chip.

* * * * *